United States Patent
Zhang et al.

(10) Patent No.: US 12,146,343 B2
(45) Date of Patent: *Nov. 19, 2024

(54) LOCK MECHANISM, LOCK SYSTEM, QUICK EXCHANGE BRACKET ASSEMBLY AND ELECTRONIC VEHICLE

(71) Applicants: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

(72) Inventors: Jianping Zhang, Shanghai (CN); Chunhua Huang, Shanghai (CN); Zhibo Lan, Shanghai (CN)

(73) Assignees: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 242 days.

This patent is subject to a terminal disclaimer.

(21) Appl. No.: 17/744,726

(22) Filed: May 15, 2022

(65) Prior Publication Data

US 2022/0268058 A1 Aug. 25, 2022

Related U.S. Application Data

(63) Continuation of application No. 16/958,755, filed as application No. PCT/CN2018/125688 on Dec. 29, 2018, now Pat. No. 11,359,410.

(51) Int. Cl.
*E05B 47/00* (2006.01)
*B60L 53/80* (2019.01)
(Continued)

(52) U.S. Cl.
CPC .......... *E05B 47/0002* (2013.01); *B60L 53/80* (2019.02); *E05B 83/00* (2013.01);
(Continued)

(58) Field of Classification Search
CPC ...... E05B 47/00; E05B 47/0002; E05B 83/00; E05B 2047/0016; E05B 2047/0067;
(Continued)

(56) References Cited

U.S. PATENT DOCUMENTS 11,359,410 B2 * 6/2022 Zhang ...................... B60K 1/04

FOREIGN PATENT DOCUMENTS

| CN | 113511059 B | 2/2023 |
|---|---|---|
| FR | 3015774 A1 | 6/2015 |

OTHER PUBLICATIONS

Oct. 21, 2022 Brazilian 1st Office Action issued in Brazilian Patent Application No. 112020013375-2.
(Continued)

*Primary Examiner* — Suzanne L Barrett (57) ABSTRACT

Provided is a lock mechanism, wherein the lock mechanism includes a lock base, the lock base is provided with an opening and a cavity extending from the opening, the opening is used for the lock shaft mounted to the battery pack to enter the cavity, the lock mechanism further includes: a lock assembly, the lock assembly is connected to one side of the lock base opposite the lock shaft, the lock assembly is moveable relative to the lock base, and the side of the lock base opposite the lock shaft extends into the cavity or exits the cavity; wherein, the lock assembly is capable of preventing the lock shaft from exiting the cavity from the opening when the lock assembly extends into the cavity; the lock assembly is capable of allowing the lock shaft to exit the cavity from the opening when the lock assembly exits the cavity.

14 Claims, 5 Drawing Sheets

(51) Int. Cl.
*E05B 83/00* (2014.01)
*H01M 50/244* (2021.01)

(52) U.S. Cl.
CPC .............. *H01M 50/244* (2021.01); *E05B 2047/0016* (2013.01); *E05B 2047/0067* (2013.01)

(58) Field of Classification Search
CPC ............ B60L 53/80; H01M 50/244; Y10T 70/7051; Y10T 70/7057; Y10T 70/7062; Y10T 70/7068; Y10T 70/7073; Y10T 70/7096; Y10T 70/7102; Y10T 70/7107; Y10T 70/7113; Y10T 70/7119; Y10T 70/7124
USPC .............................. 70/280–283.1, 276–278.7
See application file for complete search history.

(56) References Cited

OTHER PUBLICATIONS

Nov. 21, 2022 Israeli 1st Office Action issued in Israeli Patent Application No. 293320.
Nov. 28, 2022 Eurasian 1st Office Action issued in Eurasian Patent Application No. 202192218.
Aug. 23, 2022 Fourth Office Action issued in Eurasian Patent Application No. 202091609.
Sep. 12, 2022 First Office Action issued in Philippine Patent Application No. 1-2020-551017.
Oct. 18, 2022 First Office Action issued in Japanese Patent Application No. 2022-084647.
Oct. 18, 2022 First Office Action issued in Japanese Patent Application No. 2022-084648.
First Office Action dated Jul. 4, 2022 issued in Indian Patent Application No. 202027031847.
First Office Action dated Jun. 13, 2022 issued in European Patent Application No. 18894253.6.
Third Office Action dated Jul. 5, 2022 issued in Eurasian Patent Application No. 202091609.
First Office Action dated May 31, 2022 issued in Egyptian Patent Application No. PCT 931-2020 .
Aug. 17, 2023 First Office Action issued in Vietnamese Patent Application No. 1-2020-04397.
May 5, 2023 Second Office Action issued in Australian Patent Application No. 2018393463.
Jun. 12, 2023 First Office Action issued in Indonesian Patent Application No. P00202005600 .
Jan. 19, 2023 First Office Action issued in Australian Patent Application No. 2018393463.
Mar. 13, 2024 Notice of Oral Hearing issued in Indian Patent Application No. 202027031847.
Feb. 5, 2024 Extended European Search Report issued in European Patent Application No. 23185313.6.

\* cited by examiner

Fig. 10

LOCK MECHANISM, LOCK SYSTEM, QUICK EXCHANGE BRACKET ASSEMBLY AND ELECTRONIC VEHICLE

CROSS REFERENCE TO RELATED APPLICATIONS

The present application is a Continuation application of U.S. patent application Ser. No. 16/958,755 filed on Aug. 20, 2020, which is a national phase application of PCT Application No. PCT/CN2018/125688 filed on Dec. 29, 2018, which claims the benefit of Chinese patent application Nos. 201711486906.9 and 201711482898.0, filed on Dec. 29, 2017. All the above are hereby incorporated by reference. the contents of which are incorporated herein by reference in their entirety.

FIELD OF INVENTION

The present invention relates to the battery replacing field of electric vehicles, and particularly to a lock mechanism, lock system, quick exchange bracket assembly and electronic vehicle.

PRIOR ARTS

The existing battery pack installation methods of electric vehicles are generally divided into a fixed type and a replaceable type, wherein the fixed battery pack is generally fixed on the car, and the car is directly used as the charging object when charging. While the replaceable battery pack is generally installed in an active manner, the battery pack can be removed at any time and replaced with a new battery pack.

In the process of replacing a new battery pack, the locking and unlocking of the battery pack is involved. Generally speaking, the left and right sides of the battery pack are equipped with lock shafts; lock devices are fixed on a quick exchange bracket to assemble into a quick exchange bracket assembly, and then the quick exchange bracket assembly is installed on the chassis of the electric vehicle together; the lock shaft coordinates with the lock device to achieve the locking of the battery pack.

The lock mechanism used in the existing lock device is usually a primary lock mechanism, the primary lock mechanism includes a lock base and a lock bolt, wherein the switching between a locked state and an unlocked state of the primary lock mechanism is realized by the rotation of the lock bolt in the lock base. Wherein, most or even all structures of the lock bolt need to be located in the lock base, occupying a large space. In addition, the existing lock device lacks a protection mechanism for the primary lock mechanism, and the primary lock mechanism is susceptible to failure, which can easily cause the battery pack to loosen or fall off.

CONTENT OF THE PRESENT INVENTION

The technical problem to be solved in the present invention is for overcoming the above-mentioned defects in prior art, hence providing a lock mechanism, lock system, quick exchange bracket assembly and electronic vehicle.

A lock mechanism used for locking and fixing a battery pack, the lock mechanism comprises a lock base, the lock base is provided with an opening and a cavity extending from the opening, the opening is used for a lock shaft mounted on the battery pack to enter the cavity, characterized in that the lock mechanism further comprises:

a lock assembly, the lock assembly is connected to one side of the lock base opposite to the lock shaft, the lock assembly is moveable relative to the lock base, and extends into the cavity or exits the cavity from the side of the lock base opposite to the lock shaft;

wherein, the lock assembly is capable of preventing the lock shaft from exiting the cavity from the opening when the lock assembly extends into the cavity;

the lock assembly is capable of allowing the lock shaft to exit the cavity from the opening when the lock assembly exits the cavity.

In this solution, the lock assembly acts on the lock shaft from the side of the lock base opposite to the lock shaft, so as to prevent the lock shaft from leaving or allow the lock shaft to leave the cavity, and the lock assembly occupies less space in the lock base, which effectively reduces the requirement for the internal space of the lock base.

Preferably, the lock assembly comprises:

a first lower housing, the first lower housing is detachably connected to one side of the lock base opposite to the lock shaft, inside of the first lower housing is provided with a first accommodating cavity, and a side wall of the lower housing is provided with a penetration hole in communication with the first accommodating cavity;

a lock pin, the lock pin is located in the first accommodating cavity, and the lock pin is inserted through the penetration hole and is switchable between an extended state and a retracted state to extend into the cavity or exit the cavity;

wherein, when the lock pin is in the extended state, the lock pin extends into the cavity;

when the lock pin is in the retracted state, the lock pin exits the cavity.

Preferably, the lock assembly further comprises:

a power pin, the power pin acts on the lock pin, and the power pin can move relative to the lock pin to engage with or detach from the lock pin;

a first electromagnetic induction element, the first electromagnetic induction element is provided on the power pin, the first electromagnetic induction element is used for driving the power pin to apply an acting force to the lock pin in a retracting direction of the lock pin under the action of an external electromagnetic device;

a first elastic element, the first elastic element is connected to an end of the lock pin away from the cavity, the first elastic element abuts between the lock pin and the inner surface of the first accommodating cavity, the first elastic element is used to apply an acting force to the lock pin in an extending direction of the lock pin;

wherein, when the first electromagnetic induction element is attracted to an external electromagnetic device, the power pin is detached from the lock pin, and applies an acting force to the lock pin in a retracting direction, so that the lock pin is in the retracted state;

when the first electromagnetic induction element is detached from the external electromagnetic device, the first elastic element applies an acting force on the lock pin in the extending direction, and the power pin is engaged with the lock pin so that the lock pin is in the extended state.

In this solution, when the first electromagnetic induction element is attracted to the external electromagnetic device, the power pin moves in a direction away from the lock pin, and applies an acting force to the lock pin in the retracting direction, so that the lock pin retracts and squeezes the first elastic element, when the power pin is completely detached from the lock pin, the first elastic element provides a restoring force to the lock pin, so that the lock pin returns to the position for engaging with the power pin. When the first electromagnetic induction element is detached from the external electromagnetic device, the power pin moves toward the lock pin to engage with the lock pin, so that the lock pin is in the extended state. In addition, in this solution, the method of magnetic attraction is used to control the engagement and detachment of the power pin and the lock pin, thereby controlling the extension and retraction of the lock pin, and the control method is simple and the control efficiency is high.

Preferably, the lock pin is provided with:

an executive part;

a connecting part, the connecting part is connected to an end of the executive part away from the cavity, the connecting part is provided with a second accommodating cavity, and the second accommodating cavity is used for accommodating the power pin;

wherein, the first elastic element is connected to an end of the connecting part away from the executive part, the first elastic element abuts between the connecting part and the inner surface of the first accommodating cavity, the first elastic element applies an acting force to the connecting part in the extending direction.

In this solution, when the power pin is engaged with the lock pin, an end of the power pin close to the lock pin is engaged in the second accommodating cavity, which is an embedded connection and takes up less space.

Preferably, a length direction of the connecting part and a height direction of the power pin form a first included angle, and the first included angle is greater than 0° and less than or equal to 90°;

the second accommodating cavity extends in the height direction of the power pin, so that the power pin moves relative to the lock pin in the height direction of the power pin.

Preferably, the power pin has a head end and a tail end along the height direction, the head end of the power pin is embedded in the second accommodating cavity, and the first electromagnetic induction element is provided at the tail end of the power pin;

the inner surface of the second accommodating cavity is provided with a first inclined part, and the head end of the power pin is provided with a second inclined part matching with the first inclined part;

wherein, when the power pin is engaged with the lock pin, the first inclined part is attached to the second inclined part;

when the power pin is detached from the lock pin, the second inclined part moves downward relative to the first inclined part and applies an acting force in the retracted direction to the lock pin, so that the lock pin is in the retracted state.

In this solution, the coordination of the first inclined part and the second inclined part is used cleverly, when the power pin moves away from the lock pin, the first inclined part slides relative to the second inclined portion, and the friction force applied by the first inclined part to the second inclined part can be decomposed into a component force in the retracted direction, and under the action of this component force, the lock pin retracts.

Preferably, the inner surface of the second accommodating cavity is further provided with a recessed part, and the head end of the power pin is provided with a protruding part matching with the recessed part;

preferably, the inner surface of the second accommodating cavity is provided with two of the first inclined parts, and the two first inclined parts are oppositely disposed on two sides of the recessed part.

In this solution, the recessed part is able to play a role in limiting the power pin, which helps to reliably engage the power pin with the lock pin, thereby helping to achieve a stable extension of the lock pin, and thus helping to achieve reliable locking of the lock shaft.

Preferably, the first electromagnetic induction element is embedded in the tail end of the power pin. In this solution, the first electromagnetic induction element does not occupy additional space outside the power pin, which is beneficial to improve space utilization. In addition, it is also beneficial to protect the first electromagnetic induction element.

Preferably, a second elastic element is sleeved on the tail end of the power pin, and the second elastic element applies an acting force to the power pin in a direction close to the connection part;

preferably, the force applied by the second elastic element to the power pin is greater than the gravity of the power pin.

In this solution, when the power pin is engaged with the lock pin, the force applied by the second elastic element to the power pin is able to prevent the power pin from falling under the action of the gravity, thereby further improving the reliability of the engagement between the power pin and the lock pin. When the power pin is required to move toward the lock pin, the force applied by the second elastic element to the power pin is able to overcome the gravity of the power pin, so that the power pin can move toward the lock pin more reliably.

preferably, the outer surface of the power pin is provided with blocking parts at positions corresponding to both ends of the second elastic element, and the second elastic element is clamped between the two blocking parts;

and/or, the second elastic element is a spring.

In this solution, the main function of the blocking part is to position the second elastic element, and thereby limiting the movement of the second elastic element in the height direction of the power pin.

Preferably, the lock assembly further comprises:

a second lower housing, the second lower housing is connected to the bottom of the first lower housing, the second lower housing is provided with a third accommodating cavity, the third accommodating cavity is in communication with the first accommodating cavity, and the power pin is located in the third accommodating cavity;

wherein, the outer surface of the power pin is provided with a blocking part at a position corresponding to one end of the second elastic element, and the second elastic element is clamped between the blocking part and the second lower housing;

and/or, the second elastic element is a spring.

Preferably, the lock assembly further comprises:

an upper housing, the upper housing is pressing-against and detachably connected to the first lower housing. In this solution, the upper housing can fix and protect the lock pin, the power pin, and the like.

Preferably, the upper housing is provided with a fourth accommodating cavity, and a first sensor is provided in the fourth accommodating cavity;

a second electromagnetic induction element is provided on the executive part;

wherein, the first sensor acts on the second electromagnetic induction element to detect that the executive part is in the extended state;

a second sensor is also provided in the fourth accommodating cavity, and the second sensor acts on the second electromagnetic induction element to detect that the executive part is in the retracted state;

the second electromagnetic induction element is magnetic steel.

In this solution, the second sensor is closer to the power pin compared with the first sensor.

Preferably, the first electromagnetic induction element is magnetic steel.

A lock system used for the battery pack, the lock system comprises a primary lock mechanism, the primary lock mechanism is provided with a locking linkage part and a lock base, the lock base is provided with an opening and a cavity extending from the opening, the opening is used for a lock shaft mounted on the battery pack to enter the cavity, the locking linkage part moves relative to the lock base to open or close the opening to unlock or lock the battery pack, characterized in that the lock system further comprises:

a secondary lock mechanism, the secondary lock mechanism is provided on a moving path of the locking linkage part, and is used to restrict the movement of the locking linkage part relative to the lock base to lock the battery pack.

In this solution, the secondary lock mechanism can limit the movement of the locking linkage part relative to the lock base, thereby improving the reliability of the primary lock mechanism and reducing or avoiding the occurrence of the battery pack falling.

Preferably, the locking linkage part comprises a lock bolt and a lock connecting rod, the lock bolt is connected to the lock connecting rod and able to rotate relative to the locking base, the lock connecting rod is used to drive the lock bolt to rotate to unlock or lock the battery pack under the action of an external force;

the secondary lock mechanism is able to move between a first position and a second position relative to the lock connecting rod;

wherein, when the secondary lock mechanism is in the first position, the secondary lock mechanism acts on the lock connecting rod to limit the movement of the lock connecting rod relative to the lock base;

when the secondary lock mechanism is in the second position, the secondary lock mechanism is disengaged from the lock connecting rod to allow movement of the lock connecting rod relative to the lock base.

In this solution, the action of the secondary lock mechanism on the lock connecting rod can be achieved by pressing a part of the secondary lock mechanism on the top of the lock connecting rod, or by abutting a part of the secondary lock mechanism against one side of the lock connecting rod.

Preferably, the secondary lock mechanism is provided on one side of the lock base opposite to the lock shaft of the battery pack;

the secondary lock mechanism comprises:

a first lower housing, the first lower housing is detachably connected to one side of the lock base opposite to the lock shaft, inside of the first lower housing is provided with a first accommodating cavity, and a side wall of the lower housing is provided with a penetration hole in communication with the first accommodating cavity;

a lock pin, the lock pin is located in the first accommodating cavity, and the lock pin is inserted through the penetration hole and is switchable between an extended state and a retracted state;

wherein, when the lock pin is in the extended state, the lock pin is located in the first position;

when the lock pin is in the retracted state, the lock pin is located in the second position.

In this solution, the lock pin switches between the first position and the second position by controlling the extension and retraction of the lock pin, and the structure of this solution is simple and easy to implement.

Preferably, the secondary lock assembly further comprises:

a power pin, the power pin acts on the lock pin, and the power pin can move relative to the lock pin to engage with or detach from the lock pin;

a first electromagnetic induction element, the first electromagnetic induction element is provided on the power pin, the first electromagnetic induction element is used for driving the power pin to apply an acting force to the lock pin in a retracting direction of the lock pin under the action of an external electromagnetic device;

a first elastic element, the first elastic element is connected to an end of the lock pin away from the cavity, the first elastic element abuts between the lock pin and the inner surface of the first accommodating cavity, and the first elastic element is used to apply an acting force to the lock pin in an extending direction of the lock pin;

wherein, when the first electromagnetic induction element is attracted to the external electromagnetic device, the power pin is detached from the lock pin, and applies an acting force to the lock pin in the retracting direction, so that the lock pin is in the retracted state;

when the first electromagnetic induction element is detached from the external electromagnetic device, the first elastic element applies an acting force on the lock pin in the extending direction, and the power pin is engaged with the lock pin so that the lock pin is in the extended state.

Preferably, the secondary lock mechanism is used to press against the middle of the lock connecting rod.

In this solution, the secondary lock mechanism acting on the middle of the lock connecting rod is helpful to improve the stability of the lock connecting rod and the reliability of the secondary lock mechanism acting on the primary lock mechanism, and thereby helping to improve the locking reliability of the primary lock mechanism to the battery pack.

Preferably, the primary lock mechanism comprises three of the lock bases, three of the lock bolts are connected to the lock connecting rod, and the three lock bolts and the three lock bases are configured to be correspondingly one-on-one;

and/or, one side of the lock connecting rod facing the lock base is further provided with an unlocking block, the unlocking block is an arc-shaped protrusion formed outward from the lock connecting rod, and the top of the unlocking block is an inner arc groove recessed toward the lock connecting rod;

and/or, the lock system comprises a plurality of the secondary lock mechanism, and the plurality of the secondary lock mechanism is used to evenly press against the top of the lock connecting rod.

The present invention also provide a quick exchange bracket assembly, characterized in that it comprises a quick exchange bracket and the lock system as mentioned above, the lock base and the secondary lock mechanism are respectively connected to opposite sides of the same side of the quick exchange bracket.

The present invention also provide a quick exchange bracket assembly, characterized in that it comprises a quick exchange bracket and the lock system as mentioned above, the lock base and the secondary lock mechanism are respectively connected to opposite sides of the same side of the quick exchange bracket;

the quick exchange bracket is provided with a through hole, and the lock pin switches between the first position and the second position through the through hole.

The present invention also provide a quick exchange bracket assembly used for mounting the battery pack, characterized in that the quick exchange bracket assembly comprises a quick exchange bracket and the lock mechanism as mentioned above, the lock base and the lock assembly are respectively connected to opposite sides of the same side of the quick exchange bracket, the quick exchange bracket is provided with a channel for the lock assembly to extend or retract.

The present invention also provide an electric vehicle, characterized in that it comprises a battery pack and the quick exchange bracket assembly as mentioned above, the battery pack is mounted on the quick exchange bracket, and the lock base is connected to one side of the quick exchange bracket close to the battery pack.

DESCRIPTION OF REFERENCE SIGNS IN THE DRAWINGS

Reference signs shared by embodiment 1 and embodiment 2:

101 first lower housing; 1011 first accommodating cavity; 1012 penetration hole; 102 lock pin; 1021 executive part; 1022 connecting part; 1023 second accommodating cavity; 1024 first inclined part; 1025 recessed part; 1026 second electromagnetic induction element; 103 power pin; 1031 blocking part; 1032 second inclined part; 104 first electromagnetic induction element; 105 first elastic element; 106 second elastic element; 107 second lower housing; 1071 third accommodating cavity; 108 upper housing; 1081 fourth accommodating cavity; 1082 first sensor; 1083 second sensor Embodiment 1

10 lock assembly; 20 lock shaft; 30 lock base; 40 connecting plate Embodiment 2

10 secondary lock mechanism; 20 primary lock mechanism; 201 locking linkage part; 2011 lock bolt; 2012 lock connecting rod; 202 lock base; 203 unlocking block; 30 quick exchange bracket; 301 through hole

DETAILED DESCRIPTION OF THE PREFERRED EMBODIMENT

The following embodiments further illustrate the present invention, but the present invention is not limited by the following embodiments thereto.

Embodiment 1

Figure 1:
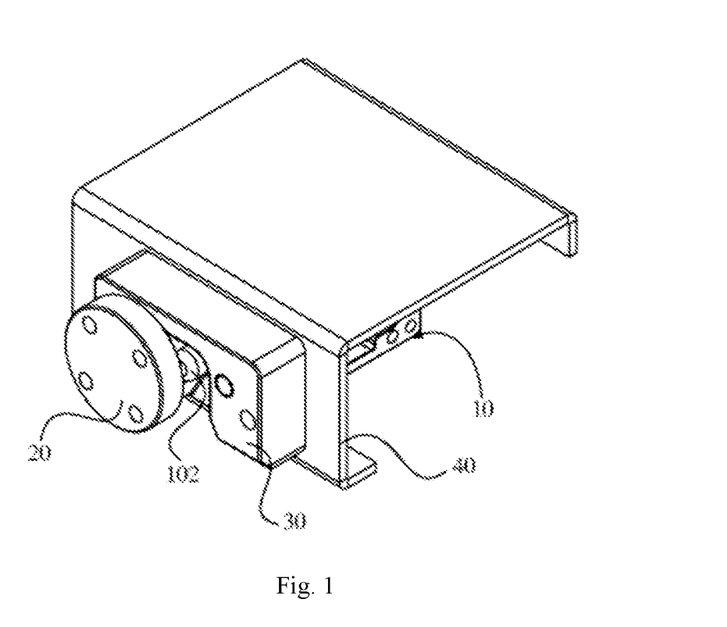
FIG. 1 is a schematic structural diagram of the lock mechanism according to embodiment 1 of the present invention.
Figure 2:
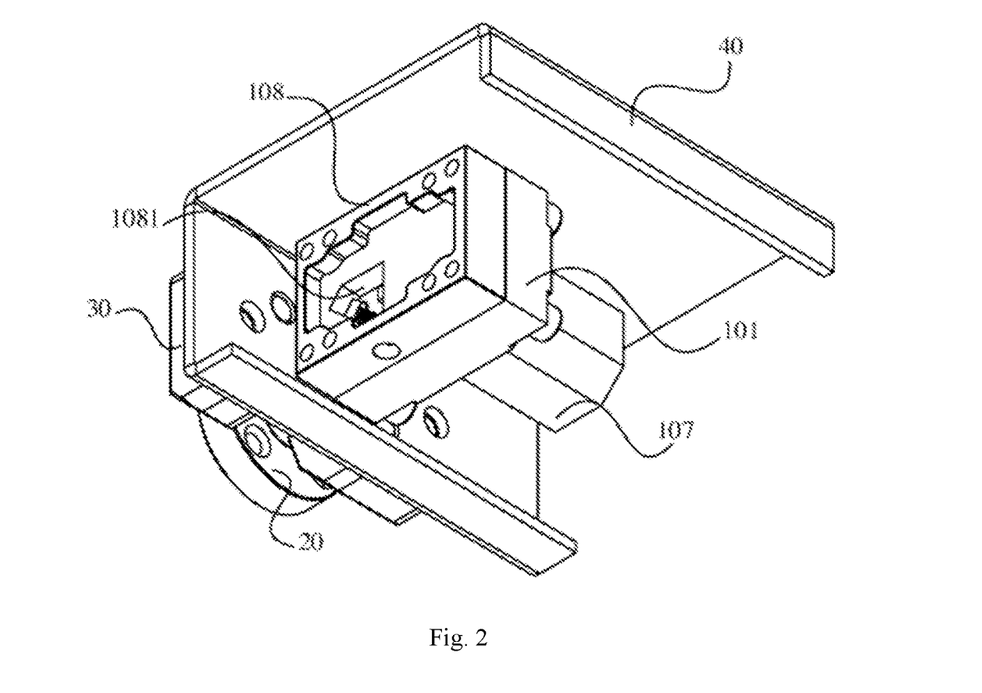
FIG. 2 is a schematic structural diagram of another position state of the lock mechanism according to embodiment 1 of the present invention.
Figure 3:
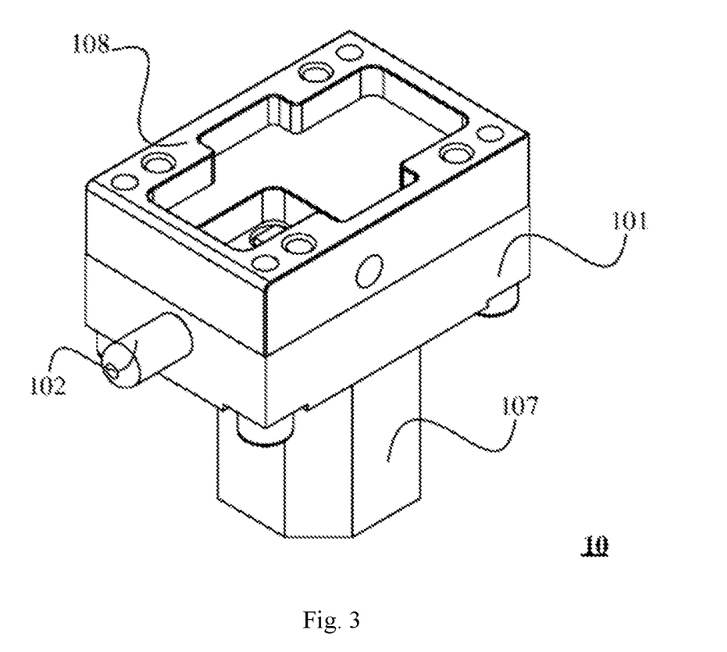
FIG. 3 is a schematic diagram of the overall structure of the lock assembly in the lock mechanism according to embodiment 1 of the present invention.

The embodiment discloses a lock mechanism for locking and fixing the battery pack. As shown in FIG. 1 and FIG. 2, the lock mechanism comprises a lock base 30, the lock base 30 is provided with an opening and a cavity extending from the opening, the opening is used for a lock shaft 20 mounted on the battery pack to enter the cavity, the lock mechanism further comprises a lock assembly 10, the lock assembly 10 is connected to one side of the lock base 30 opposite to the lock shaft 20, the lock assembly 10 is moveable relative to the lock base 30, and extends into the cavity or exits the cavity from the side of the lock base 30 opposite to the lock shaft 20. Wherein, the lock assembly 10 is capable of preventing the lock shaft 20 from exiting the cavity from the opening when the lock assembly 10 extends into the cavity; the lock assembly 10 is capable of allowing the lock shaft 20 to exit the cavity from the opening when the lock assembly 10 exits the cavity.

In this embodiment, the lock assembly 10 acts on the lock shaft 20 from the side of the lock base 30 opposite to the lock shaft 20, so as to prevent the lock shaft 20 from leaving or allow the lock shaft 20 to leave the cavity, and the lock assembly 10 occupies less space in the lock base 30, which effectively reduces the requirement for the internal space of the lock base 30.

It should be noted that the connecting plate 40 is schematically shown in FIGS. 1-2. In this embodiment, the locking assembly 10 is connected to the lock base 30 through the connecting plate 40. When the lock mechanism is mounted on the quick exchange bracket, the connecting plate is actually the side wall of the quick exchange bracket.

Refer to FIGS. 2-6 to understand, the lock assembly 10 comprises a first lower housing 101 and a lock pin 102. The first lower housing 101 is detachably connected to one side of the lock base 30 opposite to the lock shaft 20, the inside of the first lower housing 101 is provided with a first accommodating cavity 1011, and a side wall of the lower housing is provided with a penetration hole 1012 in communication with the first accommodating cavity 1011. The lock pin 102 is located in the first accommodating cavity 1011, and the lock pin 102 is inserted through the penetration hole 1012 and is switchable between an extended state and a retracted state to extend into the cavity or exit the cavity. Wherein, when the lock pin 102 is in the extended state, the lock pin 102 extends into the cavity; when the lock pin 102 is in the retracted state, the lock pin 102 exits the cavity.

Refer to FIGS. 2-6 to understand, the lock assembly 10 further comprises a power pin 103, a first electromagnetic induction element 104, and a first elastic element 105. The power pin 103 acts on the lock pin 102, and the power pin 103 can move relative to the lock pin 102 to engage with or detach from the lock pin 102. The first electromagnetic induction element 104 is provided on the power pin 103, the first electromagnetic induction element 104 is used for driving the power pin 103 to apply an acting force to the lock pin 102 in the retracting direction of the lock pin 102 under the action of an external electromagnetic device. The first elastic element 105 is connected to an end of the lock pin 102 away from the cavity, the first elastic element 105 abuts between the lock pin 102 and the inner surface of the first accommodating cavity 1011, the first elastic element 105 is used to apply an acting force to the lock pin 102 in the extending direction of the lock pin. Wherein, when the first electromagnetic induction element 104 is attracted to the external electromagnetic device, the power pin 103 is detached from the lock pin 102, and applies an acting force to the lock pin 102 in the retracting direction, so that the lock pin 102 is in the retracted state; when the first electromagnetic induction element 104 is detached from the external electromagnetic device, the first elastic element 105 applies an acting force on the lock pin 102 in the extending direction, and the power pin 103 is engaged with the lock pin 102 so that the lock pin 102 is in the extended state.

In this embodiment, when the first electromagnetic induction element 104 is attracted to the external electromagnetic device, the power pin 103 moves in a direction away from the lock pin 102, and applies an acting force to the lock pin 102 in the retracting direction, so that the lock pin 102 retracts and squeezes the first elastic element 105, when the power pin 103 is completely detached from the lock pin 102, the first elastic element 105 provides a restoring force to the lock pin 102, so that the lock pin 102 returns to the position for engaging with the power pin 103. When the first electromagnetic induction element 104 is detached from the external electromagnetic device, the power pin 103 moves toward the lock pin 102 to engage with the lock pin 102, so that the lock pin 102 is in the extended state. In addition, in this solution, the method of magnetic attraction is used to control the engagement and detachment of the power pin 103 and the lock pin 102, thereby controlling the extension and retraction of the lock pin 102, and the control method is simple and the control efficiency is high.

Refer to FIGS. 3-7 to understand, the lock pin 102 is provided with an executive part 1021 and a connecting part 1022. The connecting part 1022 is connected to an end of the executive part 1021 away from the cavity, the connecting part 1022 is provided with a second accommodating cavity 1023, and the second accommodating cavity 1023 is used for accommodating the power pin 103. Wherein, the first elastic element 105 is connected to an end of the connecting part 1022 away from the executive part 1021, the first elastic element abuts between the connecting part 1022 and the inner surface of the first accommodating cavity 1011, the first elastic element 105 applies an acting force to the connecting part 1022 in the extending direction. When the power pin 103 is engaged with the lock pin 102, the end of the power pin 103 close to the lock pin 102 is engaged in the second accommodating cavity 1023, which is an embedded connection and takes up less space.

In this embodiment, as shown in FIGS. 3-6, the length direction of the connecting part 1022 and the height direction of the power pin 103 form a first included angle, and the first included angle is equal to 90°, the second accommodating cavity 1023 extends in the height direction of the power pin 103, so that the power pin 103 moves relative to the lock pin 102 in the height direction of the power pin 103.

It should be noted that, in other alternative embodiments, the first included angle may also be set to any angle greater than 0° and less than 90°.

Refer to FIGS. 3-6 and 8 to understand, the power pin 103 has a head end and a tail end along the height direction, the head end of the power pin 103 is embedded in the second accommodating cavity 1023, and the first electromagnetic induction element 104 is provided at the tail end of the power pin 103. The inner surface of the second accommodating cavity 1023 is provided with a first inclined part 1024, the head end of the power pin 103 is provided with a second inclined part 1032 matching with the first inclined part 1024. Wherein, when the power pin 103 is engaged with the lock pin 102, the first inclined part 1024 is attached to the second inclined part 1032; when the power pin 103 is detached from the lock pin 102, the second inclined part 1032 moves downward relative to the first inclined part 1024 and applies an acting force in the retracted direction to the lock pin 102, so that the lock pin 102 is in the retracted state.

In this embodiment, the coordination of the first inclined part 1024 and the second inclined part 1032 is used cleverly, when the power pin 103 moves away from the lock pin 102, the first inclined part 1024 slides relative to the second inclined portion 1032, and the friction force applied by the first inclined part 1024 to the second inclined part 1032 can be decomposed into a component force in the retracted direction, and under the action of the component force, the lock pin 102 retracts.

Figure 5:
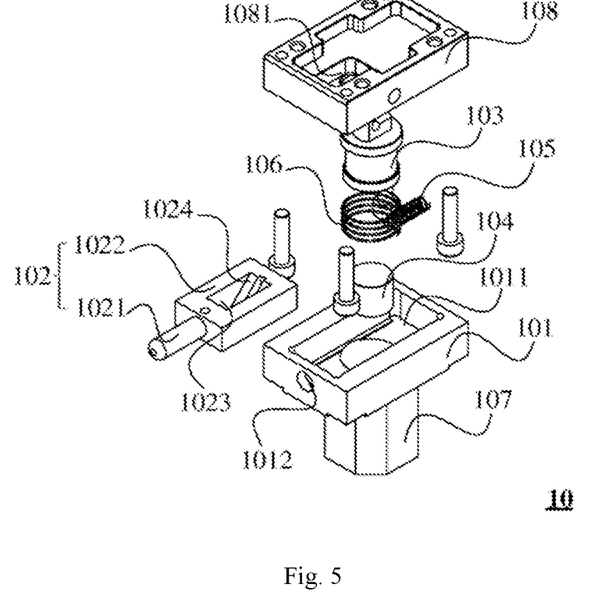
FIG. 5 is an exploded schematic diagram of the lock assembly according to embodiment 1 of the present invention.
Figure 6:
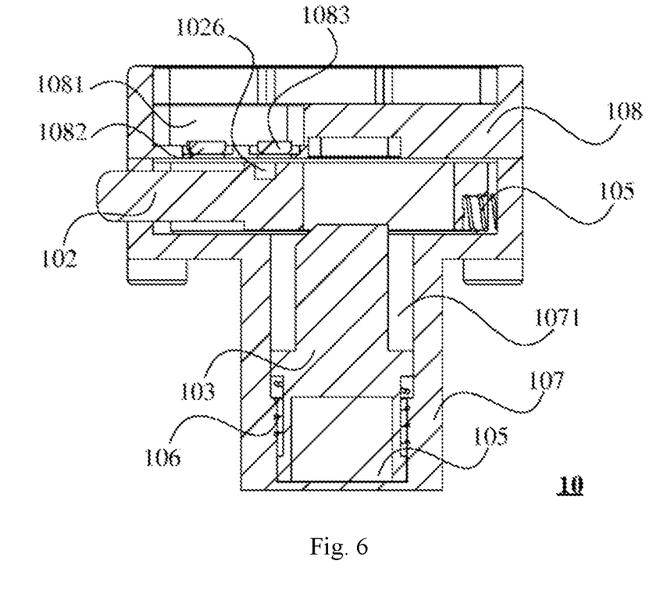
FIG. 6 is a schematic diagram of another cross-sectional structure of the lock assembly according to embodiment 1 of the present invention, in which the lock pin is in the retracted state.
Figure 7:
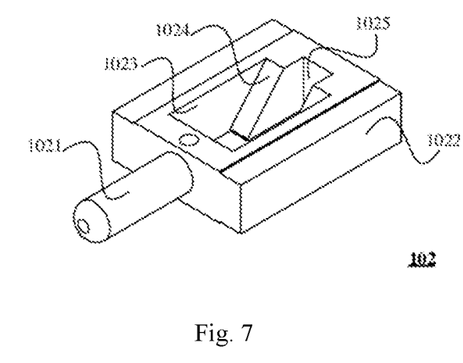
FIG. 7 is a schematic structural diagram of a lock pin in the locking assembly according to embodiment 1 of the present invention.
Figure 8:
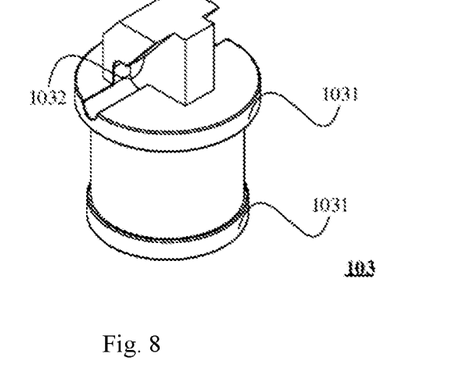
FIG. 8 is a schematic structural diagram of a power pin in a locking assembly according to embodiment 1 of the present invention.

Refer to FIGS. 5 and 8 to understand, the inner surface of the second accommodating cavity 1023 is further provided with a recessed part 1025, and the head end of the power pin 103 is provided with a protruding part matching with the recessed part 1025. The inner surface of the second accommodating cavity 1023 is provided with two of the first inclined parts 1024, and the two first inclined parts 1024 are oppositely disposed on two sides of the recessed part 1025.

In this embodiment, the recessed part 1025 is able to play a role in limiting the power pin 103, which helps to reliably engage the power pin 103 with the lock pin 102, thereby helping to achieve a stable extension of the lock pin 102, and thus helping to achieve reliable locking of the lock shaft 20.

Figure 4:
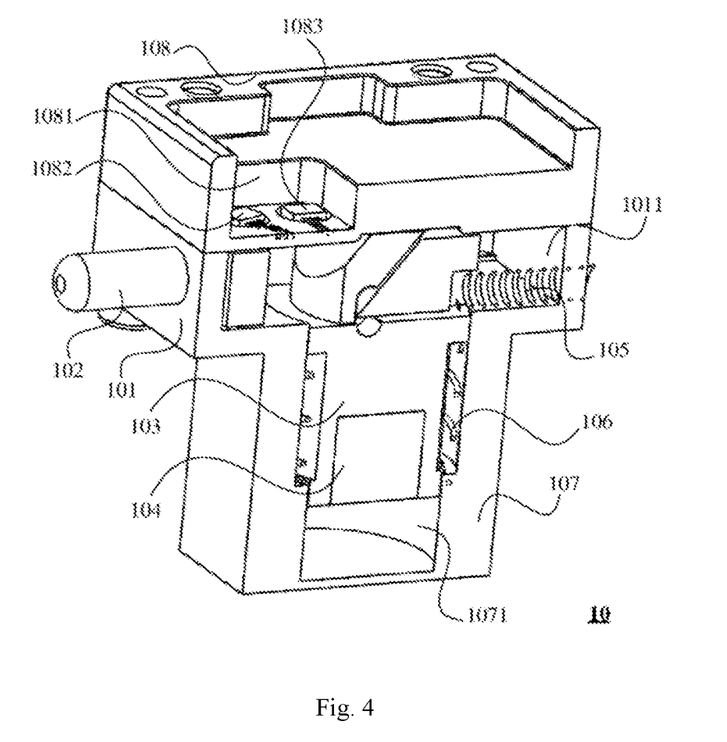
FIG. 4 is a schematic cross-sectional structural diagram of the lock assembly in the lock mechanism according to embodiment 1 of the present invention, in which the lock pin is in the extended state.

Refer to FIG. 4 to understand, the first electromagnetic induction element 104 is embedded in the tail end of the power pin 103. In this way, the first electromagnetic induction element 104 does not occupy additional space outside the power pin 103, which is beneficial to improve space utilization. In addition, it is also beneficial to protect the first electromagnetic induction element 104.

Continue to understand with reference to FIGS. 3-6, a second elastic element 106 is sleeved on the tail end of the power pin 103, and the second elastic element 106 applies an acting force to the power pin 103 in a direction close to the connection part 1022; wherein the force applied by the second elastic element 106 on the power pin 103 is greater than the gravity of the power pin 103. In this embodiment, when the power pin 103 is engaged with the lock pin 102, the force applied by the second elastic element 106 to the power pin 103 is able to prevent the power pin 103 from falling under the action of gravity, thereby further improving the reliability of the engagement between the power pin 103 and the lock pin 102. When the power pin 103 is required to move toward the lock pin 102, the force applied by the second elastic element 106 to the power pin 103 is able to overcome the gravity of the power pin 103, so that the power pin 103 can move toward the lock pin 102 more reliably.

Continue to understand with reference to FIGS. 2-6, the lock assembly 10 further comprises a second lower housing 107, the second lower housing 107 is connected to the bottom of the first lower housing 101, the second lower housing 107 is provided with a third accommodating cavity 1071, the third accommodating cavity 1071 is in communication with the first accommodating cavity 1011, and the power pin 103 is located in the third accommodating cavity 1071. A second included angle is formed between the central axis of the second lower housing 107 and the central axis of the first lower housing 101, and the second included angle is equal to the first included angle.

In this embodiment, refer to FIGS. 4-6 and 8 to understand, the outer wall surface of the power pin 103 is provided with blocking parts 1031 at positions corresponding to both ends of the second elastic element 106, and the second elastic element 106 is clamped between the two blocking parts 1031. That is to say, the second elastic element 106 is integrally sleeved on the outer wall surface of the power pin 103, and the second elastic element 106 is a spring. Wherein, the main function of the blocking part 1031 is to position the second elastic element 106, and thereby limiting the movement of the second elastic element 106 in the height direction of the power pin 103.

In other alternative embodiments, it is also feasible that a part of the second elastic element 106 is sleeved on the outer wall surface of the power pin 103, and the other part abuts against the second lower housing 107, that is, the outer wall surface of the power pin 103 is provided with a blocking part 1031 at a position corresponding to one end of the second elastic element 106, and the second elastic element 106 is clamped between the blocking part 1031 and the second lower housing 107. Specifically, one end of the second elastic element 106 abuts against the blocking part of the head end of the power pin 103, the other end of the second elastic element 106 abuts against the bottom surface of the second lower housing 107 near the tail end of the power pin 103, and at this time, the second elastic element 106 is in an elastic compression state to apply an acting force to the power pin 103 in a direction close to the locked pin 102.

Continue to understand with reference to FIGS. 2-6, the lock assembly 10 further comprises an upper housing 108, the upper housing 108 is pressing against and detachably connected to the first lower housing 101. The upper housing can fix and protect the lock pin, the power pin, and the like. The upper housing is provided with a fourth accommodating cavity 1081, and a first sensor 1082 is provided in the fourth accommodating cavity 1081; and a second electromagnetic induction element 1026 is provided on the executive part 1021. Wherein, the first sensor 1082 acts on the second electromagnetic induction element 1026 to detect that the executive part 1021 is in the extended state. A second sensor 1083 is also provided in the fourth accommodating cavity 1081, and the second sensor 1083 acts on the second electromagnetic induction element 1026 to detect that the executive part 1021 is in the retracted state. Wherein, the second sensor 1083 is closer to the power pin 103 compared with the first sensor 1082.

In addition, in this embodiment, the first electromagnetic induction element 104 and the second electromagnetic induction element 1026 are both magnetic steels.

This embodiment also provides a quick exchange bracket assembly used for mounting the battery pack. The quick exchange bracket assembly comprises a quick exchange bracket and the lock mechanism as mentioned above, the lock base and the lock assembly are respectively connected to opposite sides of the same side of the quick exchange bracket, and the quick exchange bracket is provided with a channel for the lock assembly to extend or retract.

This embodiment also provides an electric vehicle, which comprises a battery pack and the quick exchange bracket assembly as mentioned above, the battery pack is mounted on the quick exchange bracket, and the lock base is connected to one side of the quick exchange bracket close to the battery pack.

In this lock mechanism, the lock assembly acts on the lock shaft from the side of the lock base opposite the lock shaft, so as to prevent o the lock shaft from leaving or allow the lock shaft to leave the cavity. The lock assembly occupies less space in the lock base, which effectively reduces the requirement for the internal space of the lock base.

Embodiment 2

This embodiment discloses a lock system and a quick exchange bracket assembly including the same, which are used to unlock and lock a battery pack on an electric vehicle. Wherein, the quick exchange bracket assembly comprises a quick exchange bracket and a lock system, and the quick exchange bracket is mounted on the chassis of the electric vehicle.

Figure 9:
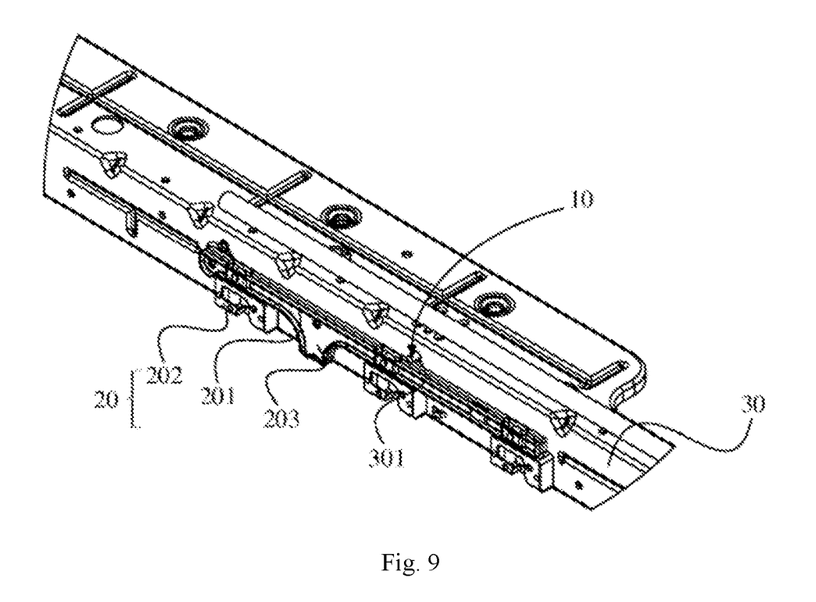
FIG. 9 is a partial structural diagram of a replacement bracket assembly according to embodiment 2 of the present invention.
Figure 10:
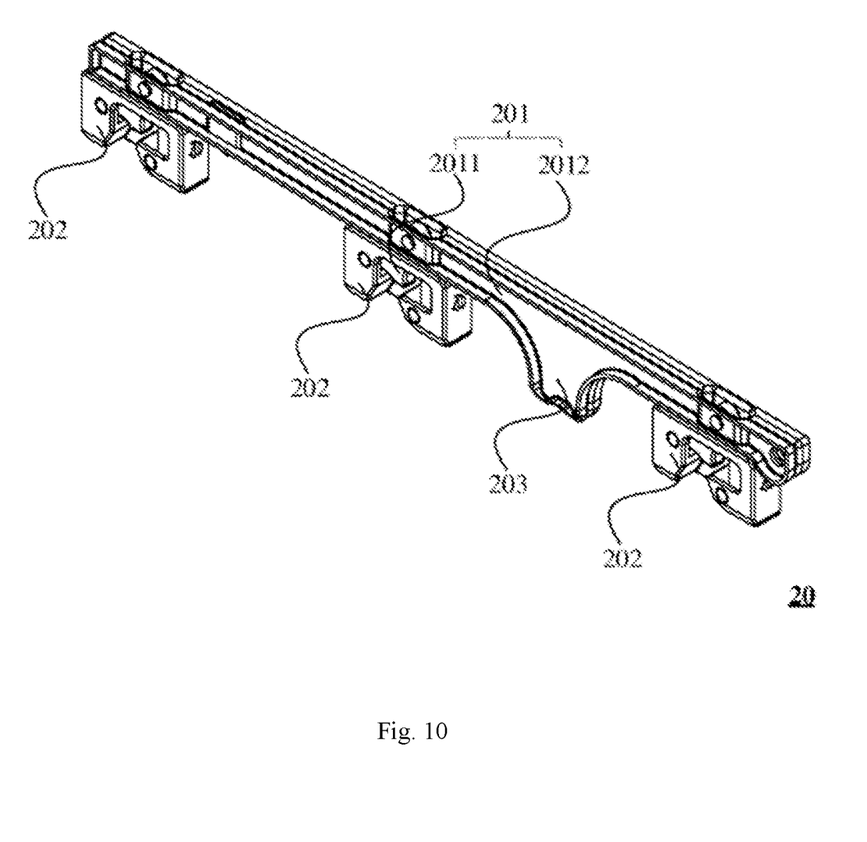
FIG. 10 is a schematic structural diagram of a primary lock mechanism in the lock system according to embodiment 2 of the present invention.

Refer to FIGS. 9-10 to understand, the lock system comprises a primary lock mechanism 20 and a secondary lock mechanism 10. Wherein, the primary lock mechanism 20 is provided with a locking linkage part 201 and a lock base 202, the lock base 202 is provided with an opening and a cavity extending from the opening, the opening is used for a lock shaft (not shown in the figure) mounted on the battery pack to enter the cavity, the locking linkage part moves relative to the lock base to open or close the opening to unlock or lock the battery pack. The secondary lock mechanism 10 is provided on a moving path of the locking linkage part 201, and is used to restrict the movement of the locking linkage part 201 relative to the lock base 202 to lock the battery pack. The lock base 202 and the secondary lock mechanism are respectively connected to opposite sides of the same side of the quick exchange bracket 30.

In this embodiment, the secondary lock mechanism can limit the movement of the locking linkage part relative to the lock base, thereby improving the reliability of the primary lock mechanism and reducing or avoiding the occurrence of the battery pack falling.

Continue to understand with reference to FIGS. 9-10, the locking linkage part 201 comprises a lock bolt 2011 and a lock connecting rod 2012, the lock bolt 2011 is connected to the lock connecting rod 2012 and able to rotate relative to the locking base 202, the lock connecting rod 2012 is used to drive the lock bolt 2011 to rotate to unlock or lock the battery pack under the action of an external force. The secondary lock mechanism 10 is able to move between a first position and a second position relative to the lock connecting rod. Wherein, when the secondary lock mechanism 10 is in the first position, the secondary lock mechanism 10 acts on the lock connecting rod 2012 to limit the movement of the lock connecting rod 2012 relative to the lock base 202; when the secondary lock mechanism 10 is in the second position, the secondary lock mechanism 10 is disengaged from the lock connecting rod 2012 to allow movement of the lock connecting rod 2012 relative to the lock base 202. The secondary lock mechanism 10 is disposed on the side of the lock base 202 opposite to the lock shaft of the battery pack.

In this embodiment, the action of the secondary lock mechanism on the lock connecting rod can be achieved by pressing a part of the secondary lock mechanism against the top of the lock connecting rod. In other alternative embodiments, this action can also be achieved by abutting a part of the secondary lock mechanism against the side of the lock connecting rod.

The structure of the secondary lock mechanism in this embodiment is basically the same as the structure of the lock assembly in embodiment 1, that is, FIGS. 3-8 in embodiment 1 are also applicable to this embodiment, and are not repeated here. Refer to FIGS. 3-6 in embodiment 1 to understand, the secondary lock mechanism 10 comprises a first lower housing 101 and a lock pin 102. The first lower housing 101 is detachably connected to one side of the lock base 30 opposite to the lock shaft, the inside of the first lower housing 101 is provided with a first accommodating cavity 1011, and a side wall of the lower housing is provided with a penetration hole 1012 in communication with the first accommodating cavity 1011. The lock pin 102 is located in the first accommodating cavity 1011, and the lock pin 102 is inserted through the penetration hole 1012 and is switchable between an extended state and a retracted state. Wherein, when the lock pin 102 is in the extended state, the lock pin 102 is located in the first position; when the lock pin 102 is in the retracted state, the lock pin 102 is located in the second position. The lock pin switches between the first position and the second position by controlling the extension and retraction of the lock pin, and the structure of this solution is simple and easy to implement. In addition, as shown in FIG. 1, the quick exchange bracket 30 is provided with a through hole 301, and the lock pin 102 switches between the first position and the second position through the through hole 301.

Refer to FIGS. 3-6 in embodiment 1 to understand, the secondary lock mechanism 10 further comprises a power pin 103, a first electromagnetic induction element 104 and a first elastic element 105. The power pin 103 acts on the lock pin 102, and the power pin 103 can move relative to the lock pin 102 to engage with or detach from the lock pin 102. The first electromagnetic induction element 104 is provided on the power pin 103, the first electromagnetic induction element 104 drives the power pin 103 to apply an acting force to the lock pin 102 in the retracting direction of the lock pin 102 under the action of an external electromagnetic device. The first elastic element 105 is connected to an end of the lock pin 102 away from the cavity, the first elastic element 105 abuts between the lock pin 102 and the inner surface of the first accommodating cavity 1011, the first elastic element 105 is used to apply an acting force to the lock pin 102 in the extending direction of the lock pin 102. Wherein, when the first electromagnetic induction element 104 is attracted to the external electromagnetic device, the power pin 103 is detached from the lock pin 102, and applies an acting force to the lock pin 102 in the retracting direction, so that the lock pin 102 is in the retracted state; when the first electromagnetic induction element 104 is detached from the external electromagnetic device, the first elastic element 105 applies an acting force on the lock pin 102 in the extending direction, and the power pin 103 is engaged with the lock pin 102 so that the lock pin 102 is in the extended state.

In this embodiment, when the first electromagnetic induction element 104 is attracted to the external electromagnetic device, the power pin 103 moves in a direction away from the lock pin 102, and applies an acting force to the lock pin 102 in the retracting direction, so that the lock pin 102 retracts and squeezes the first elastic element 105, when the power pin 103 is completely detached from the lock pin 102, the first elastic element 105 provides a restoring force to the lock pin 102, so that the lock pin 102 returns to the position for engaging with the power pin 103. When the first electromagnetic induction element 104 is detached from the external electromagnetic device, the power pin 103 moves toward the lock pin 102 to engage with the lock pin 102, so that the lock pin 102 is in the extended state. In addition, in this solution, the method of magnetic attraction is used to control the engagement and detachment of the power pin 103 and the lock pin 102, thereby controlling the extension and retraction of the lock pin 102, the control method is simple and the control efficiency is high.

Refer to FIGS. 3-7 in embodiment 1 to understand, the lock pin 102 is provided with an executive part 1021 and a connecting part 1022. The connecting part 1022 is connected to an end of the executive part 1021 away from the cavity, the connecting part 1022 is provided with a second accommodating cavity 1023, and the second accommodating cavity 1023 is used for accommodating the power pin 103. Wherein, the first elastic element 105 is connected to an end of the connecting part 1022 away from the executive part 1021, the first elastic element 105 abuts between the connecting part 1022 and the inner surface of the first accommodating cavity 1011, and the first elastic element 105 applies an acting force to the connecting part 1022 in the extending direction. When the power pin 103 is engaged with the lock pin 102, the end of the power pin 103 close to the lock pin 102 is engaged in the second accommodating cavity 1023, which is an embedded connection and takes up less space.

In this embodiment, as shown in FIGS. 3-6 of embodiment 1, the length direction of the connecting part 1022 and the height direction of the power pin 103 form a first included angle, and the first included angle is equal to 90°, the second accommodating cavity 1023 extends in the height direction of the power pin 103, so that the power pin 103 moves relative to the lock pin 102 in the height direction of the power pin 103.

It should be noted that, in other alternative embodiments, the first included angle may also be set to any angle greater than 0° and less than 90°.

Refer to FIGS. 3-6 and 8 in embodiment 1 to understand, the power pin 103 has a head end and a tail end along the height direction, the head end of the power pin 103 is embedded in the second accommodating cavity 1023, and the first electromagnetic induction element 104 is provided at the tail end of the power pin 103. The inner surface of the second accommodating cavity 1023 is provided with a first inclined part 1024, the head end of the power pin 103 is provided with a second inclined part 1032 matching with the first inclined part 1024. Wherein, when the power pin 103 is engaged with the lock pin 102, the first inclined part 1024 is attached to the second inclined part 1032; when the power pin 103 is detached from the lock pin 102, the second inclined part 1032 moves downward relative to the first inclined part 1024 and applies an acting force in the retracted direction to the lock pin 102, so that the lock pin 102 is in the retracted state.

In this embodiment, the coordination of the first inclined part 1024 and the second inclined part 1032 is used cleverly, when the power pin 103 moves away from the lock pin 102, the first inclined part 1024 slides relative to the second inclined portion 1032, and the friction force applied by the first inclined part 1024 to the second inclined part 1032 can be decomposed into a component force in the retracted direction, and under the action of the component force, the lock pin 102 retracts.

Refer to FIGS. 5 and 8 in embodiment 1 to understand, the inner surface of the second accommodating cavity 1023 is further provided with a recessed part 1025, and the head end of the power pin 103 is provided with a protruding part matching with the recessed part 1025. The inner surface of the second accommodating cavity 1023 is provided with two of the first inclined parts 1024, and the two first inclined parts 1024 are oppositely disposed on two sides of the recessed part 1025.

In this embodiment, the recessed part 1025 is able to play a role in limiting the power pin 103, which helps to reliably engage the power pin 103 with the lock pin 102, thereby helping to achieve a stable extension of the lock pin 102, and thus helping to achieve reliable locking of the lock shaft 20.

Refer to FIG. 4 in embodiment 1 to understand, the first electromagnetic induction element 104 is embedded in the tail end of the power pin 103. In this way, the first electromagnetic induction element 104 does not occupy additional space outside the power pin 103, which is beneficial to improve space utilization. In addition, it is also beneficial to protect the first electromagnetic induction element 104.

Continue to understand with reference to FIGS. 3-6, a second elastic element 106 is sleeved on the tail end of the power pin 103, and the second elastic element 106 applies an acting force to the power pin 103 in a direction close to the connection part 1022; wherein the force applied by the second elastic element 106 to the power pin 103 is greater than the gravity of the power pin 103. In this embodiment, when the power pin 103 is engaged with the lock pin 102, the force applied by the second elastic element 106 to the power pin 103 is able to prevent the power pin 103 from falling under the action of the gravity, thereby further improving the reliability of the engagement between the power pin 103 and the lock pin 102. When the power pin 103 is required to move toward the lock pin 102, the force applied by the second elastic element 106 to the power pin 103 is able to overcome the gravity of the power pin 103, so that the power pin 103 can move toward the lock pin 102 more reliably.

Continue to understand with reference to FIGS. 2-6 in embodiment 1, the secondary lock mechanism 10 further comprises a second lower housing 107, the second lower housing 107 is connected to the bottom of the first lower housing 101, the second lower housing 107 is provided with a third accommodating cavity 1071, the third accommodating cavity 1071 is in communication with the first accommodating cavity 1011, and the power pin 103 is located in the third accommodating cavity 1071. A second included angle is formed between the central axis of the second lower housing 107 and the central axis of the first lower housing 101, and the second included angle is equal to the first included angle.

In this embodiment, refer to FIGS. 4-6 and 8 to understand, the outer wall surface of the power pin 103 is provided with blocking parts 1031 at positions corresponding to both ends of the second elastic element 106, and the second elastic element 106 is clamped between the two blocking parts 1031. That is to say, the second elastic element 106 is integrally sleeved on the outer wall surface of the power pin 103, and the second elastic element 106 is a spring. Wherein, the main function of the blocking part 1031 is to position the second elastic element 106, and thereby limiting the movement of the second elastic element 106 in the height direction of the power pin 103.

In other alternative embodiments, it is also feasible that a part of the second elastic element 106 is sleeved on the outer surface of the power pin 103, and the other part abuts against the second lower housing 107, that is, the outer wall surface of the power pin 103 is provided with a blocking part 1031 at a position corresponding to one end of the second elastic element 106, and the second elastic element 106 is clamped between the blocking part 1031 and the second lower housing 107.

Continue to understand with reference to FIGS. 2-6, the secondary lock mechanism 10 further comprises an upper housing 108, the upper housing 108 is pressing against and detachably connected to the first lower housing 101. The upper housing 108 can fix and protect the lock pin, the power pin, and the like. The upper housing 108 is provided with a fourth accommodating cavity 1081, and a first sensor 1082 is provided in the fourth accommodating cavity 1081; a second electromagnetic induction element 1026 is provided on the executive part 1021. Wherein, the first sensor 1082 acts on the second electromagnetic induction element 1026 to detect that the executive part 1021 is in the extended state. A second sensor 1083 is also provided in the fourth accommodating cavity 1081, and the second sensor 1083 acts on the second electromagnetic induction element 1026 to detect that the executive part 1021 is in the retracted state. Wherein, the second sensor 1083 is closer to the power pin 103 compared with the first sensor 1082. Through the first sensor 1082, the second sensor 2083 and the second electromagnetic induction element 1026, it can be reliably detected when the lock pin 102 is in the extended state and the retracted state, which is beneficial to unlock and lock the battery pack by the primary lock mechanism 20. In addition, in this embodiment, the first electromagnetic induction element 104 and the second electromagnetic induction element 1026 are both magnetic steels.

In this embodiment, the lock system comprises multiple secondary lock mechanisms, and the multiple secondary lock mechanisms are used to evenly press against the top of the lock connecting rod. In addition, in this embodiment, the secondary lock mechanism adopts the way of electromagnetically attracting the power pin to realize the extension and retraction of the lock pin, and the extension and retraction of the lock pin are in the same straight direction. In other alternative embodiments, other driving methods (non-electromagnetic driving methods) can be used to achieve the extension and retraction of the lock pin, and the movement path of the lock pin can also be set as a curve, and other non-lock pin structures, such as a crank mechanism and a rocker mechanism, can also be used to realize the switching between the first position and the second position of the secondary lock mechanism.

As to the primary lock mechanism, refer to FIGS. 9-10 to understand, the primary lock mechanism 20 comprises three lock bases 202, three lock bolts 2011 are connected to the lock connecting rod 201, the three lock bolts 2011 and the three lock bases 202 are configured to be correspondingly one-on-one One side of the lock connecting rod 201 facing the lock base 202 is further provided with an unlocking block 203, the unlocking block 203 is an arc-shaped protrusion formed outward from the lock connecting rod 201, and the top of the unlocking block 203 is an inner arc groove recessed toward the lock connecting rod 201. In this embodiment, the secondary lock mechanism acting on the middle of the lock connecting rod is helpful to improve the stability of the lock connecting rod and the reliability of the secondary lock mechanism acting on the primary lock mechanism, and thereby helping to improve the locking reliability of the primary lock mechanism to the battery pack.

Although the specific embodiments of the present invention are described above, it should be understood by those skilled in the art that this is only an example, and those skilled in the art can make various changes or modifications to these embodiments without departing from the principles and essence of the present invention, but these changes and modifications fall into the scope of protection of the present invention. Therefore, the scope of protection of the present invention is defined by the appended claims.

The invention claimed is:

1. A lock mechanism, wherein the lock mechanism comprises a lock assembly, the lock assembly comprises:
 a lock pin, is switchable between an extended state and a retracted state;
 a power pin, the power pin acts on the lock pin, and the power pin can move relative to the lock pin to engage with or detach from the lock pin;
 a first electromagnetic induction element, the first electromagnetic induction element is provided on the power pin, the first electromagnetic induction element is used for driving the power pin to apply a retracting acting force to the lock pin in a retracting direction of the lock pin under the action of an external electromagnetic device;
 when the first electromagnetic induction element is attracted to the external electromagnetic device, the power pin is detached from the lock pin, and applies the retracting acting force to the lock pin in the retracting direction, so that the lock pin is in the retracted state.

2. The lock mechanism according to claim 1, wherein the lock assembly further comprises a first elastic element, the first elastic element is connected to an end of the lock pin, the first elastic element is used to apply an extending acting force to the lock pin in an extending direction of the lock pin;
 when the first electromagnetic induction element is detached from the external electromagnetic device, the first elastic element applies the extending acting force on the lock pin in the extending direction, and the power pin is engaged with the lock pin so that the lock pin is in the extended state.

3. The lock mechanism according to claim 2, wherein the lock pin is provided with:
 an executive part;
 a connecting part, the connecting part is connected to an end of the execution part, the connecting part is provided with a second accommodating cavity, and the second accommodating cavity is used for accommodating the power pin.

4. The lock mechanism according to claim 3, wherein the first elastic element is connected to an end of the connecting part away from the executive part, the first elastic element applies an acting force to the connecting part in the extending direction.

5. The lock mechanism according to claim 3, wherein the power pin has a head end and a tail end along a height direction of the power pin, the head end of the power pin is embedded in the second accommodating cavity;
 the inner surface of the second accommodating cavity is provided with first inclined parts, the head end of the power pin is provided with a second inclined part matching to the first inclined part;
 when the power pin is detached from the lock pin, the second inclined part moves downward relative to the first inclined part and applies the retracted acting force in the retracted direction to the lock pin, so that the lock pin is in the retracted state.

6. The lock mechanism according to claim 4, wherein the inner surface of the second accommodating cavity is further provided with a recessed part, and the head end of the power pin is provided with a protruding part matching with the recessed par.

7. The lock mechanism according to claim 5, wherein a second elastic element is sleeved on the tail end of the power pin, and the second elastic element applies an acting force to the power pin in a direction close to the connection part.

8. The lock mechanism according to claim 7, wherein an outer surface of the power pin is provided with blocking parts at positions corresponding to both ends of the second elastic element, and the second elastic element is clamped between the two blocking parts.

9. The lock mechanism according to claim 3, wherein the lock assembly further comprises:
 a first lower housing, inside of the first lower housing is provided with a first accommodating cavity, the lock pin is located in the first accommodating cavity, the first elastic element is in the first accommodating cavity, and the first elastic element abuts between an end of the connecting part away from the executive part and the inner surface of the first accommodating cavity.

10. The lock mechanism according to claim 9, wherein the lock assembly further comprises a second lower housing, the second lower housing is connected to the bottom of the first lower housing, the second lower housing is provided with a third accommodating cavity, the third accommodating cavity is in communication with the first accommodating cavity, and the power pin is located in the third accommodating cavity;
 wherein, an outer surface of the power pin is provided with a blocking part at a position corresponding to one end of the second elastic element, and the second elastic element is clamped between the blocking part and the second lower housing.

11. The lock mechanism according to claim 3, wherein the lock assembly further comprises an upper housing, wherein the upper housing is provided with a fourth accommodating cavity, and a first sensor is provided in the fourth accommodating cavity;
 a second electromagnetic induction element is provided on the executive part;
 wherein, the first sensor acts on the second electromagnetic induction element to detect that the executive part is in the extended state.

12. The lock mechanism according to claim 11, a second sensor is also provided in the fourth accommodating cavity, and the second sensor acts on the second electromagnetic induction element to detect that the execution part is in the retracted state.

13. A quick exchange bracket assembly used for mounting a battery pack, wherein the quick exchange bracket assembly comprises a quick exchange bracket and the lock mechanism according to claim 1, the lock mechanism comprises a lock base, the lock base and the lock assembly are respectively connected to two opposite sides of a same edge of the quick exchange bracket, and the quick exchange bracket is provided with a channel for the lock assembly to extend or retract.

14. An electric vehicle, wherein the electric vehicle comprises a battery pack and the quick exchange bracket assembly according to claim 13, the battery pack is mounted on the quick exchange bracket, and the lock base is connected to one side of the quick exchange bracket which is faced to the battery pack.

* * * * *

UNITED STATES PATENT AND TRADEMARK OFFICE
CERTIFICATE OF CORRECTION

PATENT NO. : 12,146,343 B2  
APPLICATION NO. : 17/744726  
DATED : November 19, 2024  
INVENTOR(S) : Jianping Zhang et al.

Page 1 of 1

It is certified that error appears in the above-identified patent and that said Letters Patent is hereby corrected as shown below:

On the Title Page

Item (30), the following Foreign Application Priority Data was omitted, insert:
--December 29, 2017 (CN) 201711486906.9
December 29, 2017 (CN) 201711482898.0--

Signed and Sealed this
Twenty-fourth Day of June, 2025

Coke Morgan Stewart
*Acting Director of the United States Patent and Trademark Office*